2 Sheets—Sheet 1.

A. M. SOUTHARD.

CORN-PLANTERS.

No. 7,838. Reissued Aug. 7, 1877.

Witnesses:
John J. Halsted.
H. J. England.

Inventor:
A. M. Southard
by T. S. Stetson
Attorney.

N. PETERS, PHOTO-LITHOGRAPHER, WASHINGTON, D. C.

2 Sheets—Sheet 2.
A. M. SOUTHARD.
CORN-PLANTERS.
No. 7,838. Reissued Aug. 7, 1877.
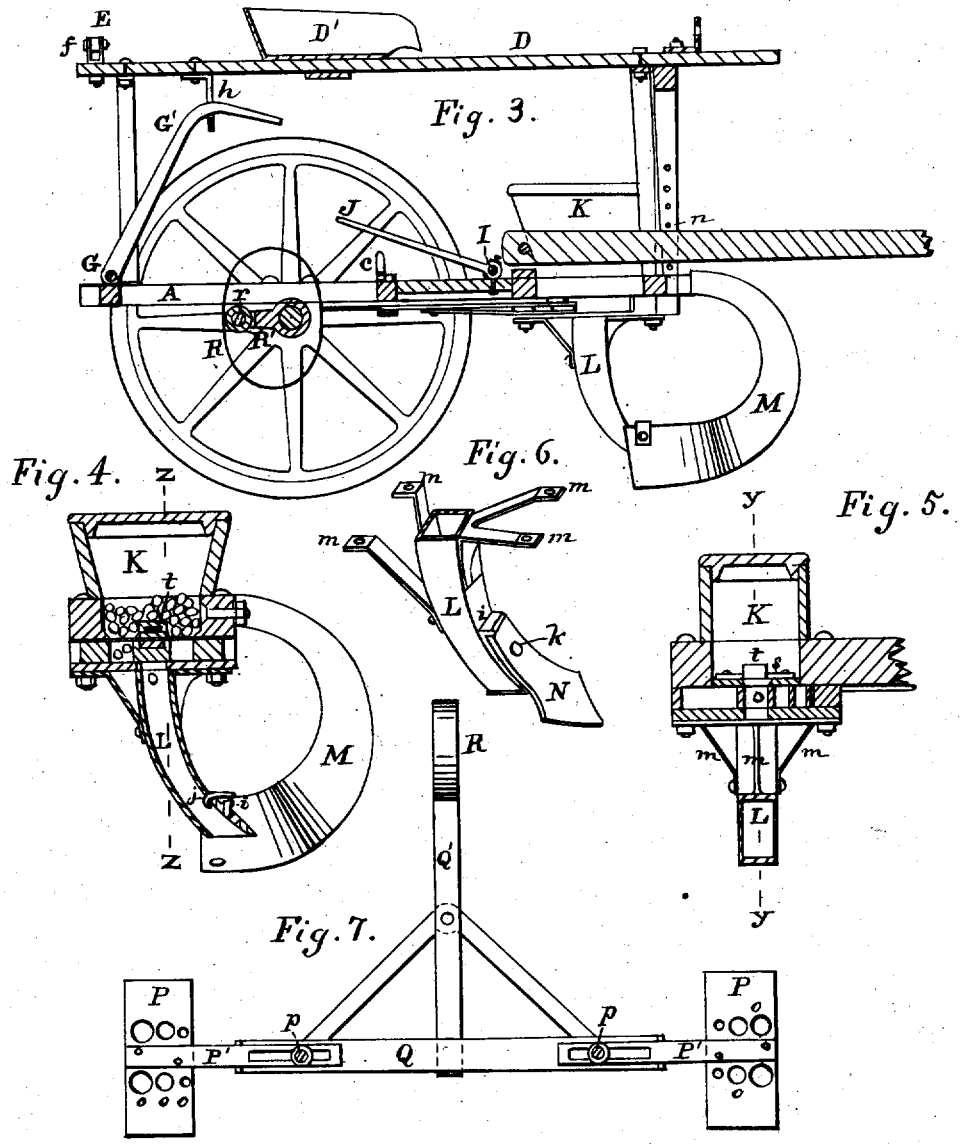
Witnesses:
John J. Halsted
H. G. England.
Inventor:
A. M. Southard
by his attorney
T. D. Stetson
N. PETERS, PHOTO-LITHOGRAPHER, WASHINGTON, D. C.

UNITED STATES PATENT OFFICE.

ABRAHAM M. SOUTHARD, OF MARSHALLTOWN, IOWA.

IMPROVEMENT IN CORN-PLANTERS.

Specification forming part of Letters Patent No. 169,307, dated October 26, 1875; reissue No. 7,838, dated August 7, 1877; application filed May 14, 1877.

*To all whom it may concern:*

Be it known that I, ABRAHAM M. SOUTHARD, of Marshalltown, Marshall county, in the State of Iowa, formerly of Eldora, in said State, have invented certain new and useful Improvements in Corn-Planters, of which a full description is contained in the following specification, reference being had to the accompanying drawing.

In the operation of my machine, I check-row the corn with only traversing over the field in one direction.

I employ wheels, each having marking-plates projecting from one side, for the purpose of making an impression in the ground at the side of each hill planted, so as to show the driver when he afterward drives alongside where each hill is located. These wheels are both bearing and marking wheels. I make one pair of such bearing and marking wheels operate the planting mechanism, being turned by traction; and I provide brakes by varying the forces on which I can compel the bearing, operating, and marking wheels to slide on the ground to the right extent to cause the planting to be performed exactly abreast of the planting in the lines adjacent, the marking-plates being so attached to the wheels as to be out of the way of the brakes. I have devised a peculiar construction, arrangement, and operation of these brakes.

My invention consists, also, in a peculiar manner of securing an ordinary guide-marker adapted to mark at a certain distance one side of the path of the machine, to aid in making the lines parallel. My construction allows the marker to be shifted from one side to the other of the machine by a half-axial rotation without detaching it or its guy.

I have devised a peculiar combination of the dropping mechanism and a peculiar construction of the seed-spouts.

Figure 1:
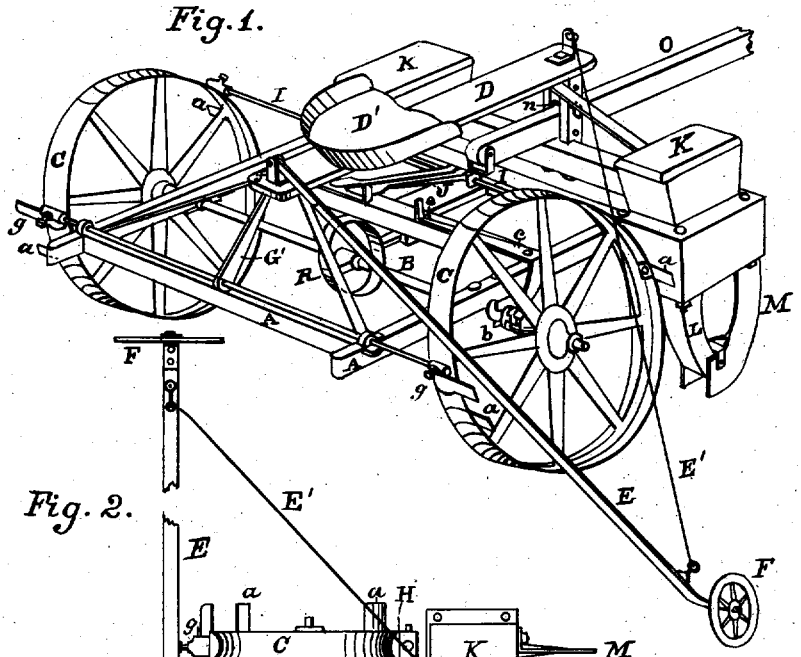
Figure 2:
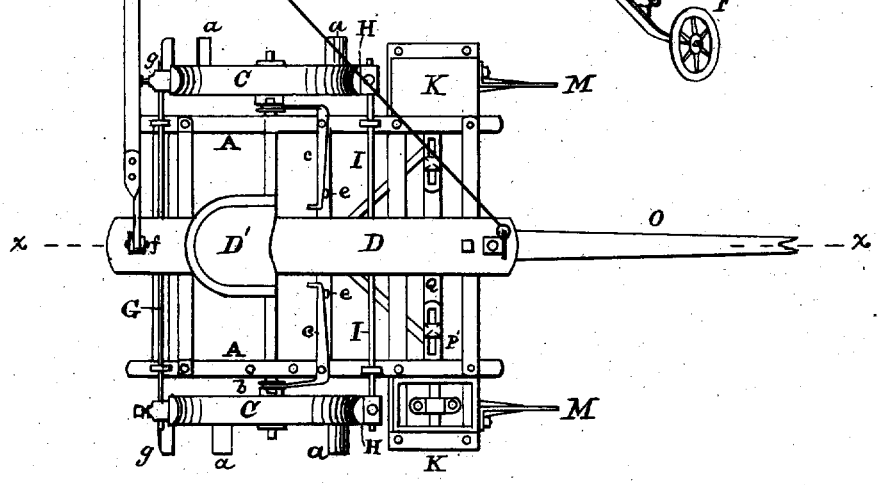

Figure 1 is a perspective view. Fig. 2 is a plan or top view. Fig. 3 is a longitudinal section taken on the line *x x* in Fig. 2. Fig. 4 is an enlarged vertical section, taken longitudinally through a seed-box and spout on the line *y y* in Fig. 5, which is a transverse section at *z z* in Fig. 4. Fig. 6 is a detached perspective view of a seed-spout with a plow attached. Fig. 7 is a detached plan view of the adjustable dropper-plates and of the vibrating or reciprocating carrier-bar.

In the drawings, A represents the main frame, of wood. B is an axle journaled through bearings under the frame, and upon each arm is sleeved a traction-wheel, C, having a broad concave rim, and upon each wheel two laterally-projecting marking-plates, *a*, are fixed.

H is a convex-ended brake, mounted at the end of a rock-shaft, I, extending from the front of each wheel-rim through boxes to the center of the frame, where the end of each rock-shaft is provided with a treadle, J, with a spring under it to throw it up, and keep the brake away from the wheel except when the treadle is depressed by the driver's foot.

The object of the brakes is to compel the machine to gain distance by sliding the wheels along on the surface of the ground to overcome the distance lost in turning, or from variation caused by uneven surfaces, and thus bring the marking-plates opposite the impressions at the side of each hill planted in the adjacent row.

The treadles are arranged side by side within easy reach of the driver's foot, so that, without moving from his seat, he can depress them separately or simultaneously. In order to check-row the operator must take care to so work the treadles, and consequently so retard the wheels at the commencing of each passage across the field, that the planting shall be effected exactly abreast of the planting in the previously-planted rows alongside. If, at any period in traversing across a field, a sliding of the wheels on the ground or any other cause shall disturb the positions so that the planting is effected much out of the line—that is to say, if the planting is effected too early or too late—he must operate the brakes, and, by losing one hill, bring the time and positions right in the remainder of the rows. G is a rock-shaft, journaled across the rear end of the frame, with a scraper, *g*, secured to each end, which scraper is adapted to fit easily the rim of the traction-wheel and markers thereon, and is held pendent a short distance therefrom by a bent lever, G′, at the middle of the rock-shaft, whose arm rests on a hook, *h*, under the seat-rest. These scrapers remove earth adhering to the wheel-rims and marking-plates. The hub of each wheel C is notched to receive a clutch-box, *b*, sliding on the axle, and actuated by a bent lever, *c*, pivoted to the top of the frame at the side, the inner end being held in position by placing it in front of a pin or stud, *e*, when it is designed to have the axle rotate with the wheel; but when the axle is not to be rotated both clutch-box levers are placed behind their studs. D is a horizontal elevated seat-rest, on which is arranged a sliding seat, D′, for the driver. E is a long, light, wooden bar, at whose outer end there is a bent iron arm, on which is mounted an iron guide-wheel, F, which, rolling upon the ground, leaves a mark, to serve as a guide for the driver, who should keep the tongue of the implement directly over it in planting after the next turn. At its inner end there is an inner eyebolt, pivoted in a swivel, *f*, pivoted in the back end of the seat-rest. E′ is a stay or guy rope, connecting the outer end of the bar E with an eye-bolt on the front end of the seat-rest, to keep the said bar at a right angle with the seat-rest when extended either to the right or left.

In turning the machine, after unclutching the axle from the wheels, the driver slides the seat back, then raises the bar E to a vertical position, and allows it to come forward and rest against his back. When the turn is completed, and the machine is moved laterally away, so as to bring the pole on the line previously described by the marking-wheel, the bar is to be lowered on the off side, or to field, to mark a fresh guide-line, giving the bar, however, a half axial rotation, so as to bring the marking-wheel to a vertical position when resting on the ground, after which the seat may be slid forward.

To regulate the depth of furrow, the heel of the draft-tongue O passes between the two uprights which support the front end of the seat-rest, and is pivoted behind them to a clevis on the main frame. A pin, *n*, is passed through holes in said uprights above the tongue. The bottom plate of each seed-box has a longitudinal slot, and below is a dropper-plate, P, mounted on the under side of a shank, P′, extending inwardly at a right angle therewith, which shank has a slot at its inner end, which rests upon a bar, Q, having a T-shaped prolongation, Q′, to the rear, terminating in a vertical elliptic frame, R. The shanks P′ are secured to the ends of the bar Q by nuts *p*, so as to form adjustable prolongations thereof. The shanks are let into the plate, so as to leave their surface flush. Through the plates P are made three pairs of seed-holes, *o*, each pair of different diameter, any pair being brought under the slot in the bottom plate of the seed-box by adjusting the shank on the bar Q according to the size of kernel or quantity of seed to be planted. The dropper-plates and connections are moved twice in each rotation of the axle by an arm, R′, fastened thereon adjustably by a set-screw, and having a roller, *r*, journaled in its extremity, which strikes each vertical wall of the elliptic frame R, and moves it forward or backward as it sweeps around, the transverse diameter of the frame being a little more than the total length of the said arm. Across the middle of the slot in the bottom of the seed-box is a vertical bar, *s*, which passes through a block, *t*, of vulcanized india-rubber, which lies in contact with the face of the dropper-plate, and directly over the passage leading into the seed-spout, so that as one hole passes under said block to discharge the seed contained in it the other hole is exposed and is being filled with seed.

The seed-boxes K K are located at the front corners of the frame, and just below the bottom of each a cast-iron seed-spout, L, is sustained by braces, *m*. Across the face of each spout, near the lower end, is cast a rib, *i*, with a hole above and another below it. M is a segment-shaped furrow-opener, open or forked at the bottom end to embrace the sides of the spout, to which it is secured by a hook, *j*, entering the upper hole, while the upper end is secured to the front girt of the frame by a bolt and nut.

For ordinary use this furrow-operator is found to be superior to the plow-shovel; but in fall-plowing it is advisable to use the latter; hence I fasten a shovel, N, to the spout by a bolt, *k*, through the lower hole, its upper end resting against the rib, which receives the thrust.

It will be seen, then, that either form of furrow-opener can be mounted on the seed-tubes, as occasion may require.

In lieu of the revolving wheel F, a wooden runner may be secured to the end of the marker-bar E, which will be found preferable to the wheel in tenacious soil, where it is liable to clog.

I claim as my invention—

1. The combination, with the seeding mechanism of a corn-planter, of bearing-wheels having smooth peripheries, brakes controllable at will acting against such peripheries, and side markers mounted on such wheels out of the way of such brakes, adapted to serve as herein specified.

2. Bearing-wheels C, having smooth peripheries, and side markers *a*, in combination with brakes H and scrapers *g* acting on said peripheries, and with the seeding mechanism of a corn-planter, as herein specified.

3. In a seeding-machine, the combination, with the frame A and traction-wheels C, of the brakes H, secured to the ends of separate rock-shafts I I, journaled in the frame in front of said wheels, each rock-shaft extending from the front of one of the wheel-rims to the center of the frame, and provided with a foot-treadle, J, the said foot-treadles being arranged side by side, so that one or both of them can be depressed by one foot, substantially as shown.

4. The combination, with the elevated seat-frame D, of the bar E, wheel F, swivel *f*, and guy-rope E′, arranged as described, so that the said bar and wheel may be changed to the opposite side of the machine, without unloosing the guy-rope, by a half-axial rotation, substantially as specified and shown.

5. The combination, with the seed-boxes K, of the dropper-plate P, having the holes *o*, and adjustably secured, by their shanks P′, to the T-shaped reciprocating bar Q Q′, substantially as described and shown.

6. The combination, with the seed-boxes, of the seed-spouts L, having the rib *i*, and a hole above and below said rib, adapted to receive a furrow-opener or a plow-shovel, substantially as described and shown.

In testimony whereof I have hereunto set my hand this 2d day of April, 1877, in presence of two subscribing witnesses.

A. M. SOUTHARD.

Witnesses:

B. C. CLARK,

WILL. RICHARDSON.